United States Patent

Cloke et al.

[11] 4,035,298
[45] July 12, 1977

[54] AQUARIUM FILTER

[75] Inventors: Stanley S. Cloke; Theodore F. Kogita, both of Seattle, Wash.

[73] Assignee: **Con*Gor, Inc.,** Kent, Wash.

[21] Appl. No.: 606,027

[22] Filed: Aug. 20, 1975

[51] Int. Cl.² .................................. E04H 3/20
[52] U.S. Cl. .............................. 210/169; 210/197; 210/244; 210/416 AS
[58] Field of Search ............ 119/3 S; 210/169, 194, 210/197, 244, 416

[56] References Cited

U.S. PATENT DOCUMENTS

| | | | |
|---|---|---|---|
| 3,247,826 | 4/1966 | Girard | 119/5 |
| 3,490,416 | 1/1970 | Kelley et al. | 119/5 |
| 3,516,544 | 6/1970 | Sesholtz | 210/169 |
| 3,529,574 | 9/1970 | Kelly | 119/5 |
| 3,720,318 | 3/1973 | Cohen | 119/5 |
| 3,720,319 | 3/1973 | White | 210/169 |
| 3,738,491 | 6/1973 | Dockery | 210/169 |
| 3,815,547 | 6/1974 | Willinger et al. | 119/5 |

OTHER PUBLICATIONS

Marine Aquarium Keeping, Stephen Spotte, 1973, John Wiley & Sons, Inc., pp. 25–43, New York, N.Y.

*Primary Examiner*—Theodore A. Granger
*Attorney, Agent, or Firm*—Graybeal, Barnard & Uhlir

[57] ABSTRACT

An elongated air discharge tube extends along the bottom of a chamber in an elongated housing. The housing is placed on the bottom of an aquarium tank along a side wall thereof. The tube includes a plurality of upwardly directed air discharge openings. The discharged air flows upwardly through the chamber and then through openings in the chamber's lid, to issue as a wall of air bubbles into the tank. The rising air bubbles create a circulation pattern of the water in the tank, first upwardly with the air curtain, then laterally across the tank to the opposite wall thereof, then downwardly, then back along the bottom of the tank to the air curtain side of the tank. The inlet to the air pump chamber may include a filter chamber in which a replaceable filter material is provided, for mechanically removing suspended particles from the circulating water. In the preferred embodiment the elongated housing is removably insertable into a socket formed along one side of an under gravel filter member, so that the air pump will draw the water through a gravel filter bed provided on top of the filter member as well as through the filter chamber forming a part of the air pump assembly. The under gravel filter member includes a top wall formed to include a pattern of alternating ridges and valleys. The general plane of the top wall ascends from the side of the filter member opposite and air pump assembly to the air pump assembly side. Air passage openings are provided in the valley regions. The water flowing back along the bottom of the tank encounters the ascending sides of the ridges and is directed by them downwardly to the water passage openings. The air pump draws such water through these openings and into and through the filter material, and then through the air pump itself, before returning it to the main part of the tank.

13 Claims, 5 Drawing Figures

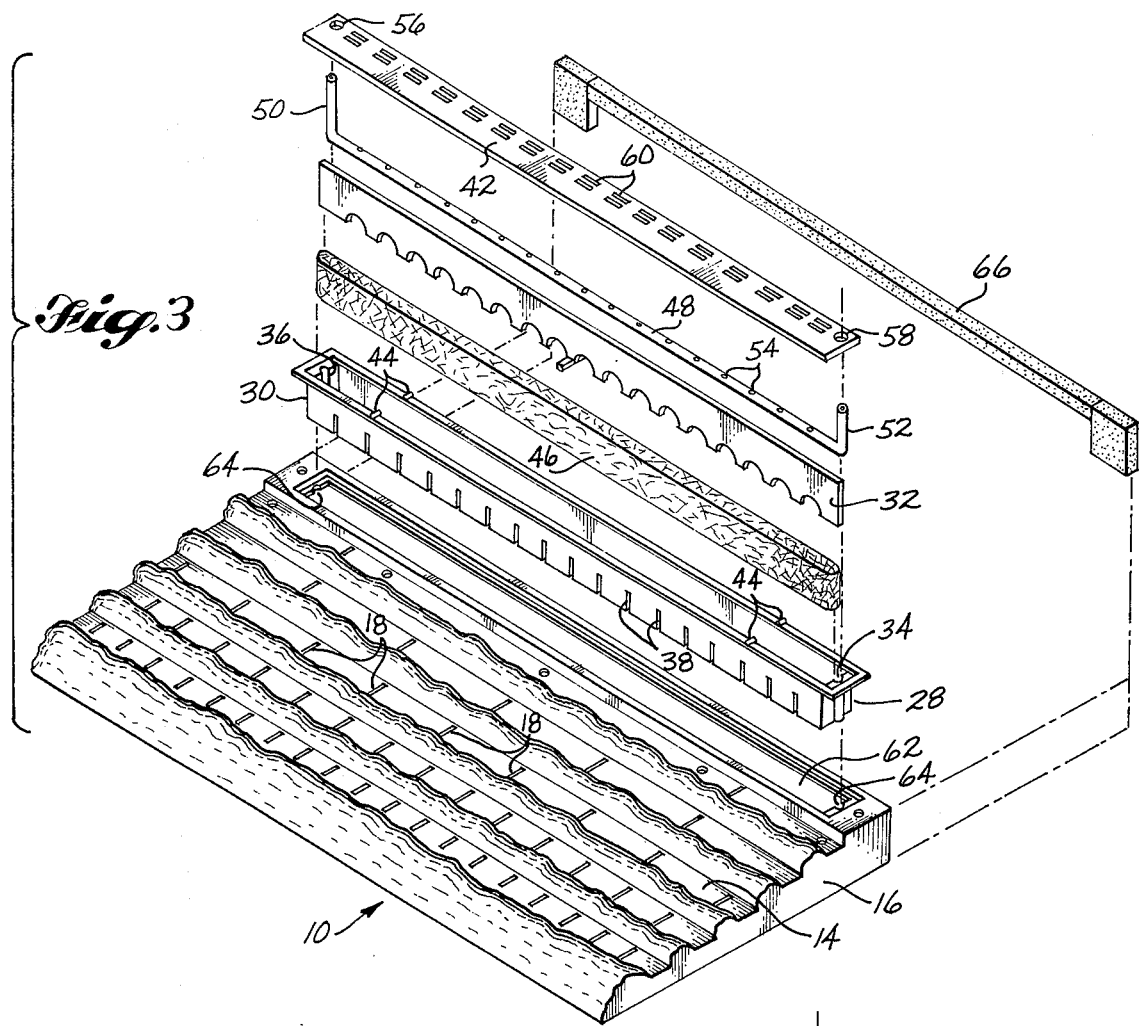
Fig. 3
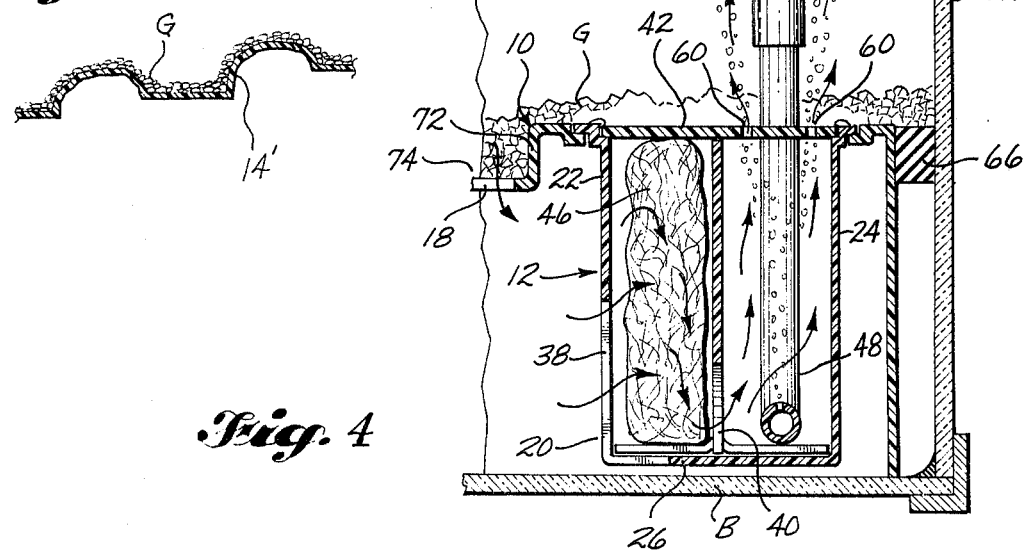
Fig. 5
Fig. 4

AQUARIUM FILTER

BACKGROUND OF THE INVENTION

1. Field of the Invention

This invention relates to a new mechanism for mechanically filtering suspended matter from aquarium water, and in particular to a submerged filtering apparatus adapted to cause full circulation and full filtering of all the water in the tank.

2. Description of the Prior Art

Harmful and potentially harmful substances (fish excretion, uneaten food, etc.) may gradually accumulate in aquarium water, eventually poisoning the animals. Only effective filtration can keep this from happening. Generally speaking, "filtration" can be defined as the removal of unwanted substances from the water. A successful aquarist uses three types of filters: biological, mechanical and chemical.

Biological filtration is solely the work of bacteria attached to the surfaces of gravel or other bottom material in the aquarium. Bacteria reaches the filter bed by various means: the air, the animals themselves, the food fed to the animals, and even the hands of the aquarist. As the water ages, the numbers of bacteria increase until the gravel teems with them. Generally speaking, biological filtration, may be defined as the removal of unwanted substances, primarily ammonia, from the water by bacteria. "Mechanical" filtration is the removal of suspended particles from the water. This function is performed by the gravel in the aquarium and in some systems by a filtering vibrous material through which the water is directed. Without mechanical filtration the water would be turbid instead of clear. "Chemical" filtration is defined as the removal of dissolved organics by adsorption, air-stripping, or direct oxidation to simpler chemical substances. For adsorption, activated carbon is the most reliable means. A main object of the present invention is to provide a quite simple and yet extremely effective filtration system for performing all three types of filtration.

The amount of animals an aquarium can safely hold is its "carrying capacity". More captive marine animals die from the result of overcrowding than from any other combination of factors. The animal load that an aquarium tank of given dimensions can accommodate is dependent to a considerable extent on the effectiveness of its filtration system. Accordingly, another object of this invention is to provide an improved filtration system which will result in a larger carrying capacity for any given aquarium tank.

A quite good discussion of the subject "filtration" can be found in the book *Marine Aquarium Keeping*, by Stephen Spotte, Director of Aquariums, Aquarium Systems, Inc., Eastlake, Ohio, published in 1973 by John Wiley & Sons, New York.

Various types of prior art filtering apparatus are disclosed by the following U.S. Pat.: U.S. Pat. No. 2,636,473 granted Apr. 28, 1953 to Albert J. Schwartz and Samuel H. Barbour; U.S. Pat. No. 2,676,921, granted Apr. 27, 1954, to Mary L. M. Vansteenkiste; U.S. Pat. No. 2,871,820, granted Feb. 3, 1959, to Edward F. Hayden; U.S. Pat. No. 2,935,199, granted May 3, 1960 to Allan H. Willinger; U.S. Pat. No. 3,418,973, granted Dec. 31, 1968, to Schinichi Saito; U.S. Pat. No. 3,487,440, granted Dec. 30, 1969 to Robert Newsteder; U.S. Pat. No. 3,516,544, granted June 23, 1970 to Walter Sesholtz; U.S. Pat. No. 3,529,574, granted Sept. 22, 1970, to William F. Kelley and Robert J. De Fasselle; U.S. Pat. No. 3,738,491, granted June 12, 1973, to Denzel J. Dockery; U.S. Pat. No. 3,720,319, granted Mar. 13, 1973, to Eugene B. White; and U.S. Pat. No. 3,827,560, granted Aug. 6, 1974, to Michael S. J. Morton. In addition to disclosing specific filtering systems these patents discuss the aquarium water cleaning problem and define various other filtration systems known to the particular patentee. These patents should be thoroughly considered together with the instant specification for the purpose of putting the present invention in proper perspective.

Most of the above-identified patents disclose filtration systems which have become known as "undergravel" filtration systems. Generally speaking, these systems comprise a relatively shallow platform on which the aquarium gravel is placed. Small openings are provided in the platform so that water can flow downwardly through such openings into the space below the platform. One or more airpipes are provided for causing the water to circulate in the tank and downwardly through the gravel. The main purpose of this type of system is to promote water movement through the gravel, so that the gravel can perform the filtering function. A disadvantage of this type of system is that it does not promote complete circulation of the water. As a result, only a portion of the water is filtered, leaving dead spots in the aquarium where untreated waste material collects. Also, most of the patented systems do not include any way of collecting and removing the waste material which collects in the compartment below the platform. As a result, it becomes necessary for the aquarist to completely remove everything from the aquarium in order to clean out such collected matter. This means that the gravel bed must be disturbed and this in turn means that the bacteria growth needed for biological filtration must be disturbed also. Thus, after each such cleaning the aging process must be repeated in order to return the aquarium to a condition in which biological filtration will occur. An object of this invention is to provide an aquarium filtering apparatus which causes a substantially full circulation of the water in the tank, so that substantially all of the water is continuously moved through the gravel filter bed. A further object of the invention is to provide aquarium filtering apparatus which includes means for mechanically filtering the water which flows through the chamber below the gravel supporting platform. The removed materials are collected in a housing which is removable from the aquarium without it being necessary to disturb the gravel bed.

SUMMARY OF THE INVENTION

The filtering apparatus of the present invention is basically characterized by an elongated air pump housing adapted to be disposed on the bottom of an aquarium tank, generally along one side wall of such tank. Herein the term "air pump" is used to mean a pump for moving water which is powered by streams of air directed through the water. Such air pump housing includes an air pump chamber which extends substantially the full length of the housing. Such chamber includes inlet means adapted to receive water from the bottom portion of the tank, laterally inwardly of the air pump housing, and a lid including a plurality of spaced apart outlet openings. An elongated air discharge tube extends lengthwise of the air pump housing, generally along the bottom of the air pump chamber. The air discharge tube includes a plurality of spaced apart discharge openings. In operation, air is supplied into the air discharge tube, to be discharged therefrom outwardly through the discharge openings. The air first flows upwardly through the air pump chamber, drawing water upwardly with it, and then flows out through the outlet openings into the tank, and bubbles upwardly through the tank water in the form of an air wall or air curtain. This causes the aquarium water to first flow upwardly from the region in the aquarium tank adjacent the air pump housing, then laterally across the upper portion of the aquarium tank, then downwardly and back towards the inlet means in the pump housing. In this manner a substantially complete circulation of the aquarium water is achieved.

In preferred form, the filtering apparatus also includes a filter member adapted to be disposed from the bottom of the aquarium tank, to provide a supporting platform for filtering sand or gravel, or to instead provide a top wall which by itself forms a bottom for the fish compartment without the use of gravel. In any event, the filter member includes a top wall which is substantially equal in width and depth dimensions to the bottom of the aquarium tank, and means for supporting such top wall above the aquarium tank bottom, so as to form a space in the aquarium tank below the top wall. In the preferred embodiment this filter member includes an elongated socket extending along a side thereof, substantially along a full length of the aquarium tank. The top wall also includes spaced apart water passage openings. The elongated air pump housing is adapted to be removably inserted into the elongated socket. Inlet means for the air pump chamber is located in the space below the top wall of the filter member, so that the air pump serves to promote flow of water from such space through the air pump housing and back into the aquarium tank.

The air pump housing may include a fibrous filter material for mechanically removing suspended particles from the water and/or activated charcoal or the like for chemically treating the water. When the particular filtering material that is used becomes dirty, the air pump housing is merely removed from the filter member and the filtering material is replaced. If gravel is used, the aquarist need only reach down into the aquarium water and move a small amount of gravel off from the top of the air pump housing, and then lift the air pump housing up out from the socket in the filter member. The air pump housing is then opened and the mechanical and/or chemical filtering materials are removed and replaced by clean filtering materials. Then, the air pump housing is reinserted back into the socket and the gravel is by hand pushed back over the top of it.

Other features and advantages of the filtering apparatus of the present invention are described below in conjunction with the description of the preferred embodiments.

BRIEF DESCRIPTION OF THE DRAWINGS

FIG. 3 is an exploded isometric view of the filtering apparatus taken from the same aspect as FIG. 1;

FIG. 4 is an enlarged view of the lower right portion of FIG. 2, showing the removable air pump assembly in greater detail; and FIG. 5 is a fragmentary cross sectional view of a top wall portion of a second embodiment of the filter member, such member being characterized by an attached gravel bed.

DESCRIPTION OF THE PREFERRED EMBODIMENT

Figure 1:
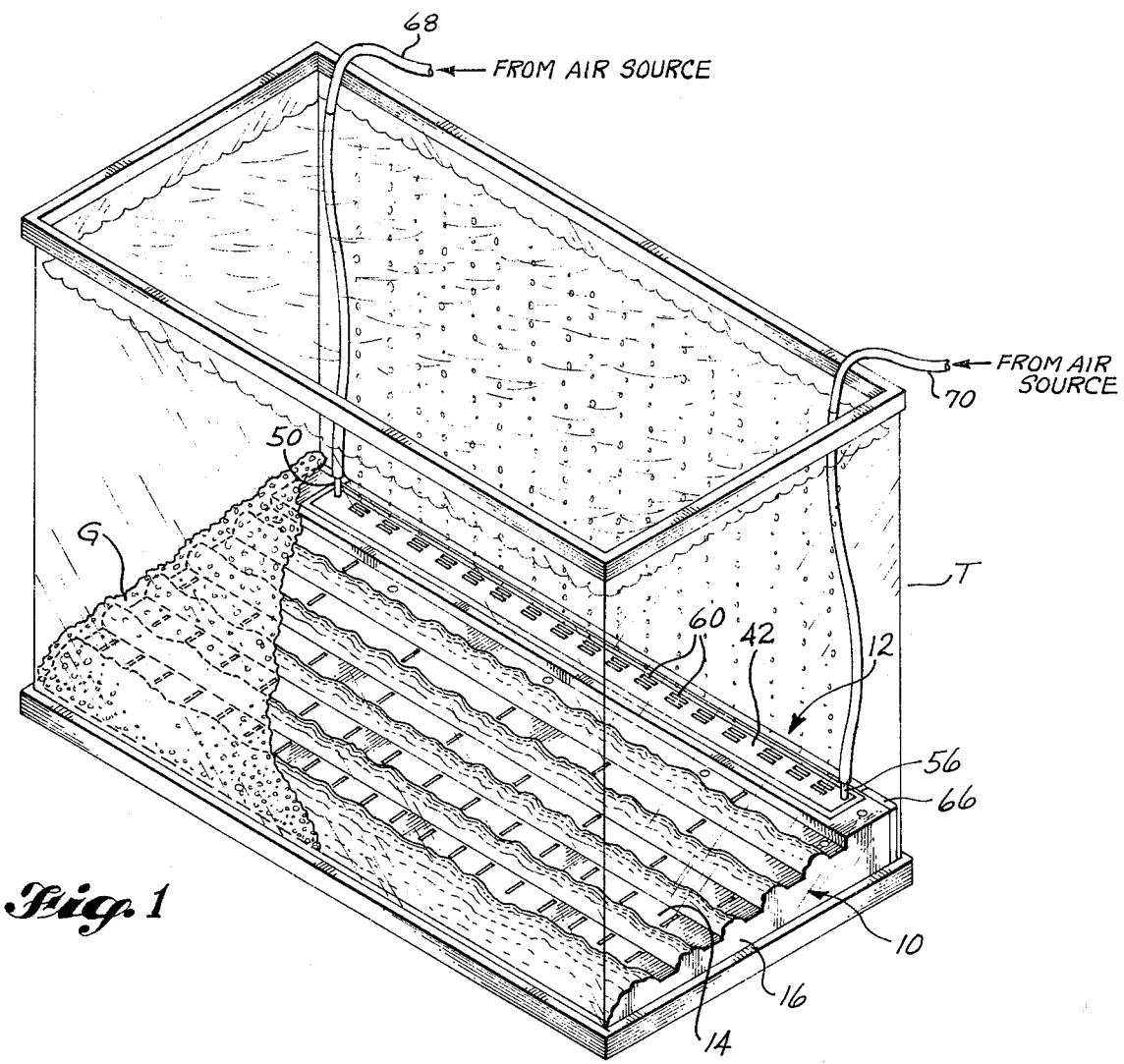
FIG. 1 is an isometric view looking from above and towards the front and one end of an aquarium tank equipped with the filtering apparatus embodying the present invention, with a portion of the filter gravel being removed for clarity of illustration of the filter member which sets on the bottom of the tank.

Referring more specifically to the drawing, the embodiment of the invention illustrated by FIGS. 1 – 4 comprises two major components. The first component is a filter member 10 that is adapted to be disposed on the bottom B of the aquarium tank T. The second major component is an air pump assembly 12 which is movably received within a socket portion of the filter member 10.

Figure 2:
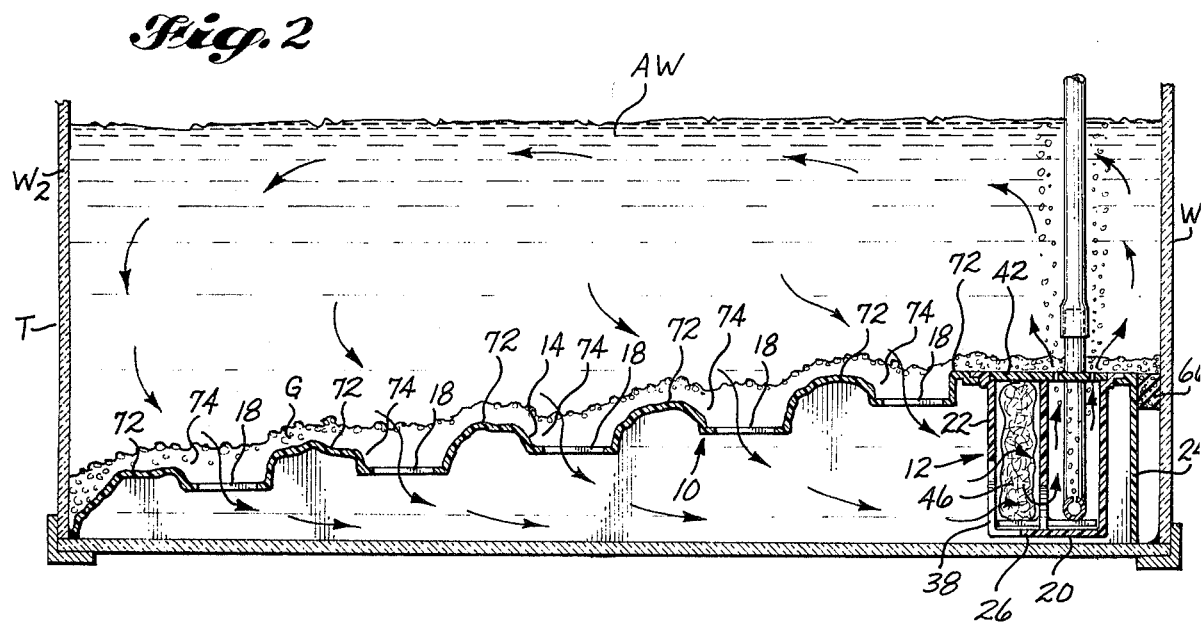
FIG. 2 is a fragmentary cross sectional view of the lower portion of the tank, showing the filtering apparatus in operation.

The filter member 10 includes a top wall 14 that is substantially equal in width and depth dimensions to the bottom B of the aquarium tank. Filter member 10 also includes end walls 16 or the like for supporting said top wall 14 above the aquarium tank bottom B. As best shown by FIG. 2 aquarium gravel or sand G is supported on top of the top wall 14 in the usual manner. A subgravel space or chamber is formed in the aquarium tank T below the top wall 14. Water passage openings 18 are cut into the top wall 14, to permit water circulation between the spaces above and below the top wall 14, as will hereinafter be described in some detail.

The air pump assembly 12 of the preferred embodiment performs three important functions. Firstly, it supplies the energy to the water which causes the water to circulate. Secondly, it injects air into the water at or near the upper surface of the gravel bed. Thirdly, it houses filtering means for removing suspended particles from the aquarium water.

Structurally, the air pump assembly 12 comprises an elongated box-like housing 20. Air pump housing 20 includes a first or inboard side wall 22, a second or outboard side wall 24, a bottom wall 26, and a pair of end walls 28, 30. Air pump housing 20 also includes a removable intermediate wall 32 which is supported within the housing 20 between the two side walls 22, 24. One manner of supporting wall 32 is illustrated. It consists simply of forming the two end walls 28, 30 to include a pair of inwardly directed opposed slots 34, 36 which are adapted to slidably receive and retain the end portions of intermediate wall 32.

Intermediate wall 32 divides the inner space of housing 20 into two chambers or compartments. The first chamber defined between inboard side wall 22 and intermediate wall 32 is a filter chamber. The second chamber defined between intermediate wall 32 and outward side wall 24 is an air pump chamber.

A plurality of inlet openings 38 are formed in the lower portion of inboard side wall 22. These openings 38 are spaced substantially along the full length of housing 20. A similar plurality of passageway openings 40 are formed in the lower portion of intermediate wall 32.

A common removable lid 42 may be provided for closing the tops of the two chambers. The upper border portion of housing 20 may be formed to include a plurality of snap fit catches 44, so that the lid 42 can be merely pressed into place, and be retained by the catches 44.

The filter chamber may contain an elongated absorbing filter member 46 constructed from fibrous material or a combination of fibrous material and activated carbon or the like. The air pump chamber contains an air discharge tube 48 comprising a pair of upwardly directed end portions 50, 52 and an elongated main portion. The main portion of tube 48 is formed to include a plurality of substantially equally spaced apart jet-like air discharge openings 54. Openings 56, 58 are formed in the end portions of lid 42, for receiving the upstanding end portions 50, 52 of air discharge tube 48. This arrangement provides a relatively simple but more than adequate manner of supporting the air discharge tube 48 in place within the pump housing 20. Lid 42 is provided with a plurality of outlet openings 60 spaced along the full length thereof. As shown by FIGS. 1 and 3, the openings 60 may be in the form of two rows of slots. As shown by FIGS. 2 and 4, when installed the air discharge tube 48 is preferably positioned on the bottom of the air pump chamber. The lid openings 60 are located above the air discharge openings 54.

As best shown by FIG. 3, an elongated socket 62 is formed in the filter member 10, along one side thereof, e.g. the back wall side. The air pump housing 20 is snuggly received in the socket 62. This may be easily done by sizing the outwardly projecting wall portions of the slots 34, 36 so that they make a frictional fit with recesses 64 formed in the filter member 10 at the ends of the socket 62.

Preferably, the lid 42, the border portion of housing 20 forming a seat for lid 42 are constructed to be substantially flush with the upper surface of filter member 10 (FIG. 4). A seal material 66 may be provided between the filter member 10 and the side wall of the aquarium tank adjacent which the air pump assembly 12 is situated.

Preferably each end portion 50, 52 of air discharge tube 48 constitutes an inlet. A pair of hoses 68, 70 are provided to deliver air from a mechanical pump (not shown) to the two inlets. After air, pumped continuously through hoses 68, 70, enters the air discharge tube 48, it emerges from the jet openings 54 in a pattern of bubbles which rise in the pump chamber, thereby inducing continuous upward movement of the water in such chamber. This results in a continuous drawing of new water into the air pump chamber by way of the filter chamber. A wall of air bubbles is emitted from the openings 60 into the water in the main portion of the aquarium tank. This upward flow of air bubbles induces an upward flow of water and helps to establish the circulation pattern. The movement of water through the aquarium tank is indicated by arrows in FIGS. 2 and 4. The water leaving the air pump chamber is replaced by new water from the space below top wall 14. Water leaving space 14 is replaced by new water from the space above top wall 14 which flows downwardly through the openings 18. The presence of filter member 10, and the spacing of the water passage openings 18 in its top wall 14, help account for the flow pattern. As shown by FIGS. 1 and 5, a large number of openings 18 is provided in the top wall 14 along the side of filter member 10 that is opposite from the pump assembly, and progressively fewer openings are provided in top wall 14 laterally across filter member 10 towards the pump assembly. By way of non-limitative example, the row of openings 18 located the furthest from the pump assembly may comprise 19 openings 18. The next row may comprise fourteen openings 18. The third row may comprise eight openings 18. The fourth row may comprise five openings 18. The last row, i.e. the row closest to the pump assembly, may comprise only two openings 18. This pattern of openings 18 results in a more complete circulation of water laterally across the full extent of the aquarium tank. The pump will naturally have a greater influence on the water which flows through the openings 18 located the closest to the pump chamber. Accordingly, a larger total area of water passage openings is provided in the relatively more remote areas so that the drawing power of the air pump will be spread out more and cover the full extent of the space below top wall 14.

Referring again to FIG. 2, the water which is emitted upwardly through openings 60 flows laterally across the tank to the remote side wall W2. Then, such water flows downwardly and back along the bottom upper chamber, i.e. the space above top wall 14, towards wall W1. The water is drawn through the filter gravel G and the openings 18 and into the space below the top wall 14. It then flows through the inlet openings 38 of the filter chamber and into the filter material 46 therein. The filter material 46 picks up suspended particulate matter from the water which if not removed would either settle on the bottom B or be circulated back into the tank proper. The thus cleaned water then flows from the filter chamber through openings 40 back into the air pump chamber and the cycle is repeated.

Preferably, the top wall 14 is in the form of alternating peaks and valleys 72, 74 (FIGS. 2 and 4) which are parallel to each other and also to the elongated socket 62. Preferably also, the general plane of the stop wall 14 slopes downwardly from the region of the elongated socket 62 across the filter member to the side thereof opposite the elongated socket 62. This creates an ascending pattern of the peaks to be encountered by the circulating water in its flow path back towards the elongated socket side of the tank T. In all embodiments of the invention at least some of the water passage openings 18 in the top wall 14 are situated in the valley regions 74. The ascending pattern of peaks provides an increased contact of particles in the water with the ascending sides of the peaks. This contact encourages the particles to move into the valley regions 74 from which they can flow through the openings 18 into the space below top wall 14.

Periodically gravel is pushed off from the lid 42 and the pump assembly is removed from the socket 62 and is taken apart and is cleaned. The dirty filter material 46 is thrown away and a new pad of such material is inserted in the place of the old one. Then, the pump assembly 12 is inserted into the socket 62. It is in this manner that the waste material is removed, without it being necessary to disturb the gravel bed and the beneficial bacteria growing thereon. Gravel is pushed back over the lid 42 following placement of the pump assembly 12 back into the socket 62.

A filtering system of the type shown by FIGS. 1 – 4 and a system of the type disclosed by the aforementioned U.S. Pat. No. 3,720,318 were tested for comparison purposes. Each type of filter system was installed into a separate 10 gallon tank. Water alone was placed in each tank. Then a like quantity of a green dye was placed into each tank and observed. The dye placed into the tank equipped with the filtering system of the present invention was quickly evenly distributed throughout the entire tank. The dye placed in the other tank was very slow to disperse because of incomplete circulation. Identical air pumps were used for conducting the comparison test.

In another test, conducted with a 10-gallon tank equipped with filtering apparatus of the type shown by FIS. 1 – 4, clear water was placed into the tank and then both dirty gravel and dirt off the floor were added. The dirt particles that were light enough to stay in suspension were in continuous movement throughout the tank and followed the circulation pattern indicated by the arrows in FIG. 2 of the drawing. No dead spots were observed. Within about an hour's time the tank water was clean and the filter pad was loaded with dirt particles. An examination of the filter material showed that the dirt particles were substantially evenly distributed through it.

A further test of the filtering apparatus of this invention in a 10-gallon tank involved heavily loading the tank with 25 goldfish approximately 1½ to 2 inches in length. An oversupply of food was maintained in the tank at all times. Normally, without filtration or with a conventional under gravel filter, the tank would be severely overloaded and the fish would begin to succumb within a relatively short time. While the filter was maintained clean the water stayed clear and the fish seemed at ease. A cotton filter pad containing charcoal was used. The pad was removed after 6 days of use. At that time there was an accumulation of particles in the gravel which was stirred up when the pump was stopped and the air pump assembly was removed. After the dirty filter pad was replaced with a new one of wool and charcoal the tank water began to clear immediately. Within about a half hour's time it was completely clear. Throughout the entire procedure the fish remained active and did not appear to suffer any hardship.

It was observed that the improved circulation experienced with the filtering apparatus of the present invention the food particles remained in suspension and there was less settlement in general and within a relatively short amount of time the suspended particles were removed by the filter pad. No dead spots were observed and no algae was found to be growing on the glass walls of the aquarium tank. A sufficient amount of algae growth was maintained on the gravel to handle the waste particles which did settle in the gravel and then decompose.

Again, for comparison purposes, a 10-gallon tank equipped with filtering apparatus of the type shown by FIGS. 1 – 4 of the drawing was placed side-by-side with another 10-gallon tank containing filtering apparatus of the type disclosed by U.S. Pat. No. 3,720,318. Equal size pumps were employed for supplying air to the two apparatuses. Each tank was provided with about the same amount of gravel. The tanks were evenly stocked with fish and the fish were fed in the same way throughout the test. It was observed that the tank containing filtering apparatus of the present invention stayed clear and no algae growth appeared on the glass walls of the tank at a time when the water in the other tank became cloudy and algae growth appeared on the glass side walls of the tank, indicating dead spots. Also, the second tank visibly contained an accumulation of settled waste material while the first tank did not.

As mentioned above, activated carbon, or charcoal, may be placed in the filter together with the fibrous filtering material, or in place of it, or, the activated carbon, or charcoal, may be placed in the air pump chamber. Activated carbon, or charcoal, is a porous substance containing up to 98% pure carbon. It is produced by heating carbonaceous materials like cellulose, wood, nut shells, and coal to between 900° – 1100° F (500° – 600° C) in the absence of air. The activation process takes place afterward when the material is heated again, this time in steam, to a temperature of 1650° F (900° C). Activation is accomplished when most of the hydrocarbons have been removed. Adsorptive properties of an activated carbon are largely a function of a startling amount of internal surface area. One inch (about ½ ounce) of an average activated carbon contains a total surface area of 25 million square inches. In his book, Spotte says that under ideal conditions activated carbon can remove up to 50% of its own weight in dissolved organics. No other material can perform so efficiently at such low cost.

FIG. 5 is a fragmentary view of a modified form filter member. According to this aspect of the invention, the upper wall 14' of the filter member 10, only a fragment of which is shown in FIG. 5, has particles of gravel G cemented to it. The gravel particles are large enough so that the cement can be applied to those portions in contact with other particles of gravel, or with the top wall 14', and spaces will still exist between the particles of gravel through which water may flow and in which waste material may be trapped and held. Also, it is within the scope of the invention to completely eliminate the use of filter gravel or sand. In such cases the top of the filter member would become the visible bottom portion of the fish containing chamber.

According to the invention, the "box" insert can be replaced by a body of foam plastic or the like in which the air tube is embedded. The air tube continues to function in the manner described and the body of foam plastic functions to filter the suspended particles from the water.

The purpose of the illustrated embodiments is to provide an understanding of the invention. The following claims set forth the legal limits of the invention.

What is claimed is:

1. Aquarium tank filtering apparatus, comprising:
a base member insertable into an aquarium tank to be supported on the bottom of the aquarium tank, said base member including a top wall that is substantially equal in width and length dimensions to the bottom of the aquarium tank in which said base member is to be used, and means for supporting said top wall above the aquarium tank bottom, so as to form a space in the aquarium tank below said top wall, said base member including an elongated socket extending substantially along a full side thereof, and a plurality of spaced apart water passage openings in said top wall;
an elongated pump housing removably received in said elongated socket, said pump housing containing a pump chamber which extends substantially the full length of said housing, said pump chamber having inlet means for receiving water from the space below said top wall and a lid including a plurality of spaced apart outlet openings;

an elongated air discharge tube extending lengthwise of said pump housing, generally along the bottom of the pump chamber, said air discharge tube including a plurality of spaced apart discharge openings; and means for supplying air into said air discharge tube, whereby during use of said apparatus in conjunction with an aquarium tank containing water, said air will be discharged out of said discharge tube via said discharge openings, and will flow upwardly through said pump chamber and out through said outlet openings, to in use cause circulation of aquarium water from a region adjacent said outlet openings, laterally across the aquarium tank from said pump housing and over the top wall of the base member, and downwardly through the water passage openings in said top wall, into the space below said top wall, then into the pump chamber via said inlet means, and then upwardly through said pump chamber, and outwardly from said pump chamber via said outlet openings, and back into the aquarium tank space above the base member.

2. Aquarium filtering apparatus according to claim 1, wherein there is a progressive increase in the area of water passage openings in the top wall, from the vicinity of the elongated socket laterally across the base member to the side thereof opposite said elongated socket, for the purpose of promoting full circulation of water in the aquarium tank.

3. Aquarium filtering apparatus according to claim 1, wherein the top wall of the base member is in the form of alternating peaks and valleys which are parallel to each other and also to the elongated socket, and wherein the general plane of the top wall slopes downwardly from the region of the pump housing across the base member to the side thereof opposite the pump housing, so as to create an ascending pattern of the peaks to be encountered by the circulating water in its flow path back towards the pump housing, thereby increasing the amount of contact of particles in the water with ascending portions of the peaks, and wherein at least some of the water passage openings in the top wall are situated in the valley regions thereof, in position to receive suspended particles which enter the valley regions by reason of their contacting the ascending wall portions of the peaks.

4. Aquarium filtering apparatus according to claim 3, wherein there is a progressive increase in the area of water passage openings in the top wall, from the vicinity of the air pump laterally across the filter member to the side thereof opposite said air pump, for the purpose of promoting full circulation of water in the aquarium tank.

5. Aquarium filtering apparatus according to claim 1, wherein the inlet means for the pump chamber includes a filter chamber comprising means for removing suspended matter from the water.

6. Aquarium filtering apparatus according to claim 5, wherein said elongated pump housing includes a first side wall directed towards the flow having a plurality of inlet openings therein, an opposite side wall, and an intermediate wall dividing the space between the two side walls into two chambers, with said filtering means being located in the chamber defined between the first side wall and the intermediate wall, with the pump chamber being defined between the intermediate wall and said opposite said wall, and with said intermediate wall including openings therein allowing passage of water from the filter chamber into the pump chamber.

7. Aquarium filtering apparatus according to claim 6, wherein the pump chamber lid extends over both the filter chamber and the pump chamber, and is a lid for both of said chambers.

8. Aquarium filtering apparatus according to claim 1, wherein said elongated air discharge tube includes a pair of upstanding end portions which project upwardly through openings therefor in said lid, with each said end portion including an inlet.

9. Aquarium filtering apparatus according to claim 1, wherein the lid for the pump chamber is substantially flush with the portion of the top wall which borders the elongated socket.

10. Aquarium filtering apparatus according to claim 1, wherein the outlet openings in said lid are spaced apart lengthwise of said lid and the discharge openings in the air discharge tube are spaced apart along the tube and are positioned relative to the outlet openings in the lid such that in operation a wall of air bubbles emits from the lid of the pump chamber upwardly through the aquarium water adjacent the wall of the aquarium tank adjoining the pump chamber.

11. Aquarium filter apparatus according to claim 1, wherein the intermediate wall is removable and said elongated pump housing includes means for supporting said intermediate wall in position between the inboard and outboard walls of said housing, and wherein the cover means for both of said chambers comprises a single removable lid for the elongated pump housing.

12. Aquarium tank filtering apparatus, comprising:
an elongated pump housing which in use is located generally at the bottom of an aquarium tank, generally along one side wall of such tank, said pump housing including an inboard side wall having a plurality of inlet openings therein spaced substantially along the full length of such wall, an outboard side wall, and an intermediate wall dividing the space between the two side walls into two chambers, with the chamber defined between the inboard side wall and the intermediate wall being a filter chamber and containing filtering means for removing suspended matter from the water, and with the chamber defined between the intermediate wall and the outboard side wall being a pump chamber and containing an elongated air discharge tube extending lengthwise of such chamber generally along the bottom thereof, said air discharge tube including a plurality of spaced apart discharge openings, said intermediate wall including openings therein allowing passage of water from the filter chamber into the pump chamber, and cover means for both of said chambers, with the cover means for the pump chamber including a plurality of outlet openings therein spaced apart essentially along the full length of the pump housing above the air discharge tube; and means for supplying air into said air discharge tube, whereby during operation of said apparatus with said pump housing in an aquarium tank containing water, said air will flow out from such discharge tube via said discharge openings, then upwardly through said pump chamber and out through said outlet openings in the cover means therefor, to in that manner cause circulation of aquarium water first upwardly from a region in the aquarium tank adjacent said outlet openings, then laterally across the aquarium tank, then downwardly and back towards the inlet openings in the inboard side wall of the pump housing, then through the filter means, then into the pump chamber, then upwardly through said pump chamber, and then outwardly from said pump chamber via said outlet openings, back into the aquarium tank spaced thereabove, and whereby in operation a wall of air bubbles emits from the openings in the cover of the pump chamber and extends upwardly through the aquarium water, generally along the side wall thereof.

13. Aquarium tank filtering apparatus, comprising:
a base member which in use is located within an aquarium tank and is supported on the bottom of the aquarium tank, said base member including a top wall that is substantially equal in width in length dimensions to the bottom of the aquarium tank in which said base member is to be used, and means for supporting said top wall above the aquarium tank bottom, so as to form a space in the aquarium tank below said top wall, said base member including an elongated socket extending along a side thereof and substantially along a full side of the aquarium tank, and a plurality of spaced apart water passage openings in said top wall;

an elongated pump and mechanical filtering means which is removably insertable into said elongated socket, said means in use receiving water from the space below said top wall and including means for removing suspended matter from the water;
an elongated air discharge tube extending lengthwise of said unit, said air discharge tube including a plurality of spaced apart discharge openings; and
means for supplying air into said air discharge tube, whereby during use of said apparatus, with said base member in an aquarium tank containing water, said air will be discharged out of said discharge tube via said discharge openings, and will flow upwardly through said unit and the aquarium tank, to in that manner cause circulation of aquarium water first from a region adjacent said unit, then laterally across the aquarium tank from said unit, and then back over the top wall of the base member, and downwardly through the water passage openings in said top wall, into the space below said top wall, then into said unit via said inlet means, and then upwardly through said unit and then back into the aquarium tank space above the base member.

* * * * *

UNITED STATES PATENT OFFICE
CERTIFICATE OF CORRECTION

Patent No. 4,035,298　　　　　　　　　Dated July 12, 1977

Inventor(s) Stanley S. Cloke et al

It is certified that error appears in the above-identified patent and that said Letters Patent are hereby corrected as shown below:

In the Abstract, at line 26, "opposite and air pump" should be -- opposite the air pump --.

Column 6, line 39, "stop" should be -- top --.

Column 7, line 12, "FIS." should be -- FIGS. --.

Claim 6, Column 9, line 68, "said", second occurrence, should be -- side --.

*Signed and Sealed this*

*Twenty-seventh* Day of *September 1977*

[SEAL]

Attest:

RUTH C. MASON　　　　　　　LUTRELLE F. PARKER
*Attesting Officer*　　　　*Acting Commissioner of Patents and Trademarks*